July 8, 1930.    F. L. MORSE    1,769,960
DRIVE CHAIN
Filed March 1, 1928    5 Sheets-Sheet 1
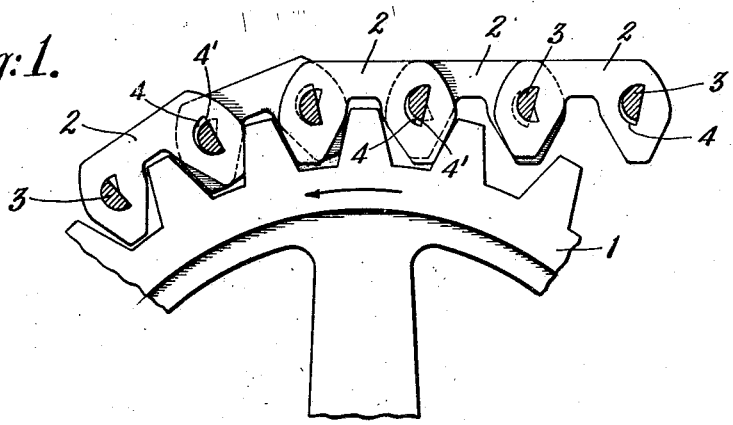
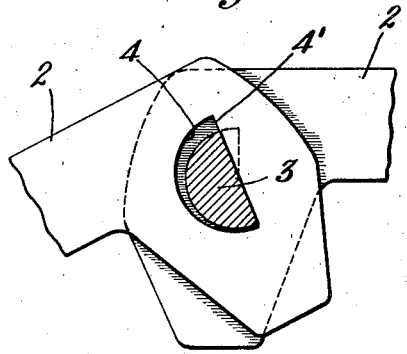
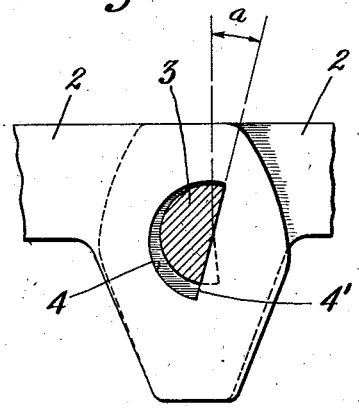
INVENTOR.
Frank L. Morse
BY
Synnestvedt & Lechner
ATTORNEYS

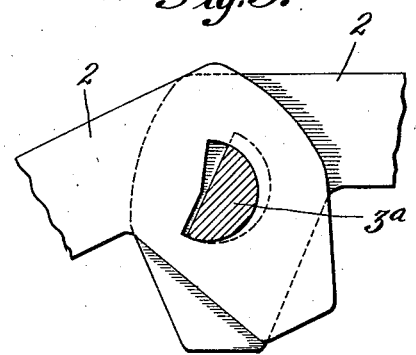
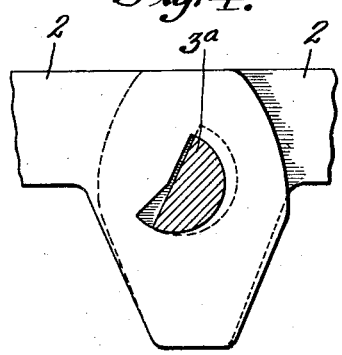
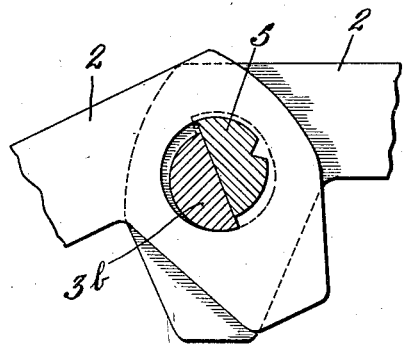
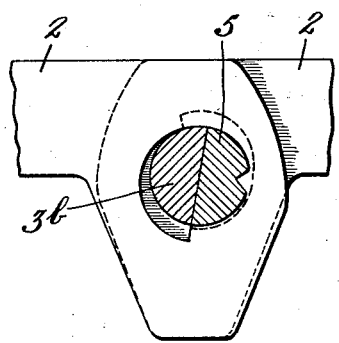

INVENTOR.
Frank L. Morse
BY
Synnestvedt & Lechner
ATTORNEYS

July 8, 1930.  F. L. MORSE  1,769,960
DRIVE CHAIN
Filed March 1, 1928   5 Sheets-Sheet 4
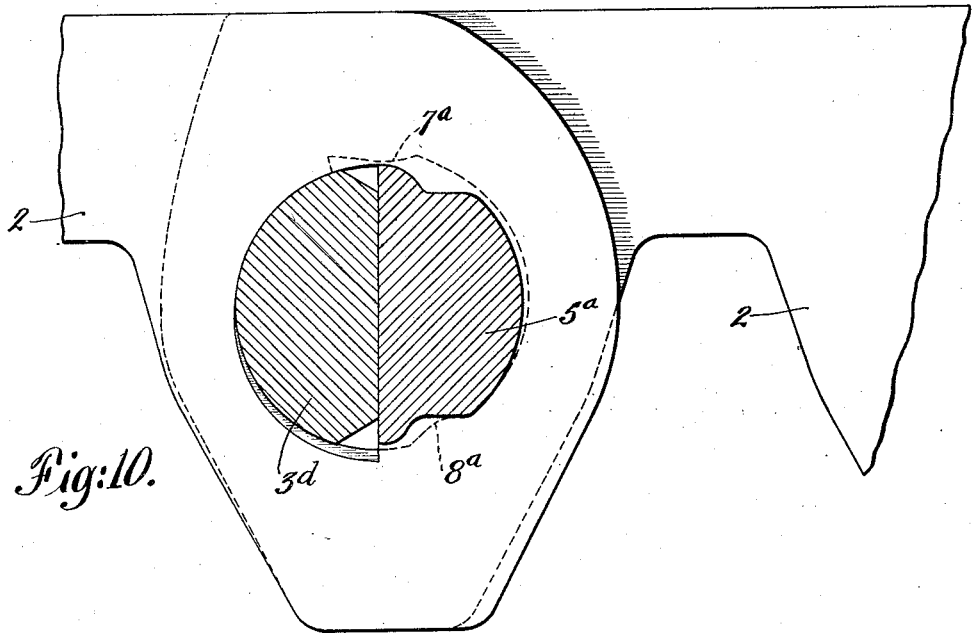
Fig:10.
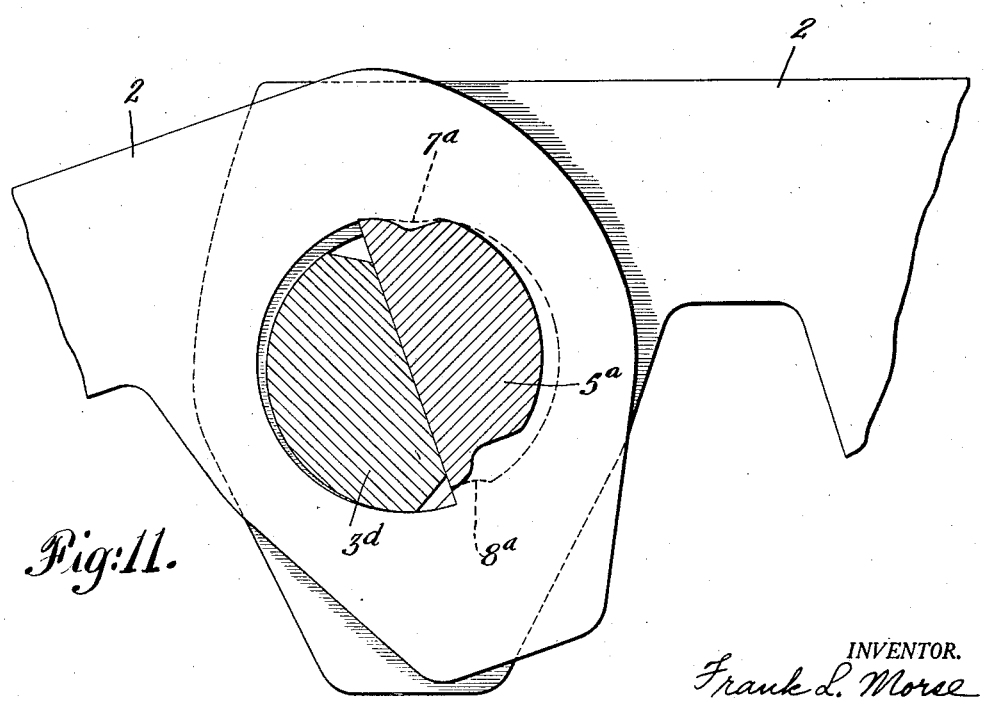
Fig:11.
INVENTOR.
Frank L. Morse
BY
Synnestvedt & Lechner
ATTORNEY.S

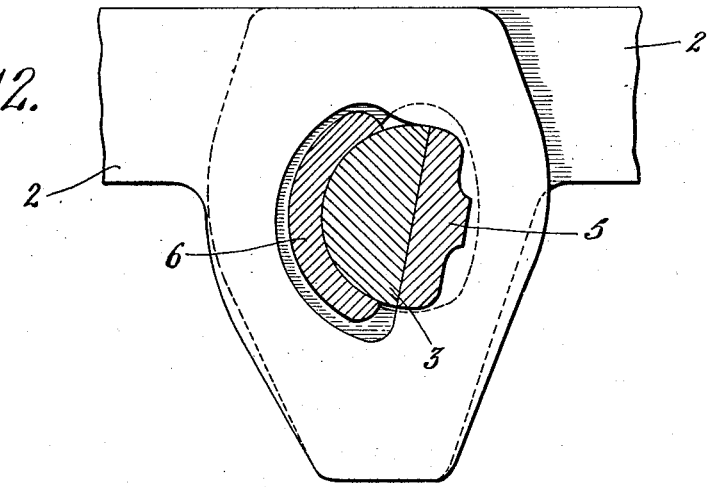
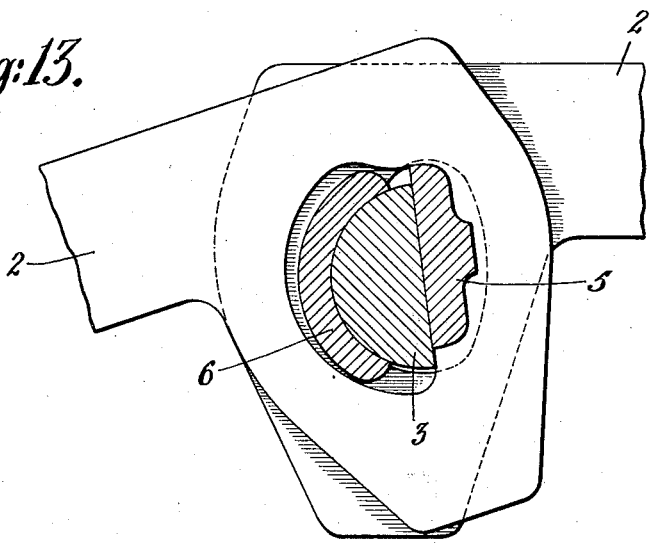

Patented July 8, 1930

1,769,960

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

DRIVE CHAIN

Application filed March 1, 1928. Serial No. 258,376.

This invention relates to chains used in the transmission of power, particularly to chains of the loose jointed or free jointed type, that is, chains in which the pintle on which a link turns is loose in the pintle holes of the adjacent link. Various examples of such chains have been produced in the past, but have not been successful in operation, and their manufacture has been abandoned. I have studied the construction and operation of these chains in an endeavor to ascertain the reasons for their lack of success, and believe that the difficulties are due to several causes which may be specified as follows: (1) where the pintle hole was straight-sided it was not tilted, and the joint was not properly self restoring; (2) where the hole was tilted it was on a curve whose radius was substantially a pitch length, and as no means was provided to control the excessive drop, premature engagement of the next link resulted; (3) the joints have had too much clearance or freedom in the inward or downward direction, which I have discovered is undesirable in such joints, while a limitation of action to less than the natural drop will improve their operation; (4) the wear has tended to be excessive.

The object of the present invention is to overcome these difficulties and provide an improved type of loose jointed chain which will be more satisfactory in service, and the means for accomplishing this are set forth in the following specification and are illustrated in preferred form in the accompanying drawings, wherein:

Fig. 1 is a side view of a portion of a chain and sprocket, the end washers being removed and the pintles being shown in cross-section to better illustrate the action.

Fig. 2 is an enlarged detail view of the joint in Fig. 1, showing the relation of the parts when the chain is straight.

Fig. 3 is a similar view showing the relation of the parts when the chain is bent.

Figs. 4 and 5 illustrate a modification in the straight and bent positions, respectively.

Figs. 6 and 7 show another modification, in the straight and bent positions, respectively, having a bushing on the shifting side of the pintle.

Figs. 10 and 11 illustrate another modification having a bushing on the shifting side of the pintle, and a somewhat different form of camming action.

Figs. 12 and 13 show another modification having bushings on both the turning and shifting sides of the pintle, the joint being shown in the straight and bent positions, respectively.

Figure 8:
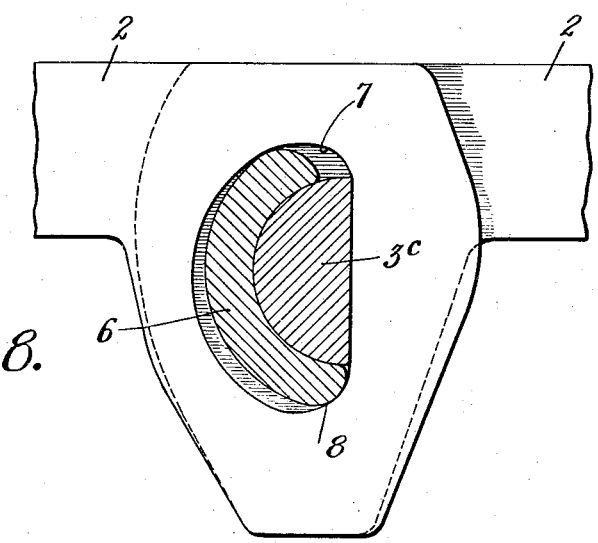
Figs. 8 and 9 are a further modification, in which a bushing is used on the turning side of the pintle, the joint being shown in the straight and bent positions, respectively.

Referring, first, to Figs. 1, 2 and 3, a sprocket 1 is shown as engaged by a chain composed of successive links 2, 2, etc., each link being generally composed of a number of arch shaped link plates by which the chain may be built up to any desired width in the ordinary manner of silent chains. While the invention is shown as applied to chains of the so-called silent type, it will be understood that it is also applicable to other types of chain. As each link is picked up or engaged by a tooth of the sprocket 1, that link begins to rotate with the sprocket, and so that link begins to turn or bend relative to the free links forming the straight or free part of the chain. As generally constructed, to permit this bending action, a joint is provided having some form of pintle part 3, such as connecting the links and allowing each link to turn relative to its succeeding link. In addition to this turning movement, in some joints there is enough clearance to permit the joint to slip or slide upward or downward within the pintle holes, i. e., transversely to the line of pull of the chain. This transverse slipping motion has been found in both the rocking friction type of joints and in the turning friction type of joints, and especially in the latter types attempts have been made to improve the smooth running of the chain by enlarging the pintle hole so that the pintle may drop downward in its engagement without striking the bottom of the pintle hole. The degree of looseness thus introduced did not accomplish the results contemplated by me, for, while it might aid one link in engaging smoothly, it impaired the engagement of the next link, so that certain beneficial results were not to be attained. In order to attain a desired action, I have discovered that it is essential that no clearance be allowed below the lower or shifted position of the pintle; in fact, instead of having clearance, or a free drop to the lowest position, the hole should be built up or shortened so as to interfere or stop the shift of the pintle when the drop is only partially completed. This elimination of bottom clearance and shortening of the pintle hole will cause part of the action to occur as though about a center forward of the joint and part of the action as though around the joint itself, in such order and degree as to smooth out the action of engagement.

In the chain shown in Fig. 1 the pintle part 3 is free to shift slightly in the pintle hole 4 in the rear end of each link plate 2, the pintle hole 4 being sufficiently short so that the pintle 3 normally strikes the bottom of the hole 4 during the engaging process, that is, before the bending action of the joint is fully completed. It will be understood that if clearance were allowed at the bottom when the chain is bent, the drop or shift would be substantially equal to the pitch radius multiplied by the versine of the angle between two teeth, or substantially equivalent to the amount the chain would drop if it were turning about the joint next preceding the joint that is shifting; whereas, under the present invention, the drop is about half that amount, or, at least, very much less, inasmuch as the shifting pintle 3 is stopped by the pintle hole 4 in the engaging process, leaving no clearance at the end of the bend.

The pintle hole 4 has a side 4′ that provides a bearing face corresponding to the contour of the cooperating face of the pintle, here shown straight, this side 4′ being inclined at an angle to a perpendicular to the line of pull, that is, the side 4′ is not at right angles to the line of pull, but is tilted backward, as indicated by the angle $a$ in Fig. 2, this angle $a$ being more than 2° and less than 10°, preferably nearer the smaller amount. When the chain is straight as shown in Fig. 2, or at the right in Fig. 1, the chain tension maintains the pintle part 3 at the top of the pintle hole, since, in that position, the tension force has a component upward on the straight inclined face 4′.

When a link having this straight inclined face 4′ is engaged by a tooth of the sprocket, it begins to rotate about the center of the sprocket, and the angularity of the face 4′ relative to the straight or free part of the chain changes, the face 4′ first becoming perpendicular to the line of pull and then tilting the other way so that a downward component of the tension force develops, which causes the pintle 3 to move toward the sprocket until it meets the bottom of the hole 4. During the remainder of the process of engagement the pintle 3 is at the bottom of the hole 4 and the bending or turning of the joint is occuring on the forward or rounded face of the pintle part 3. These shifting and turning actions may occur simultaneously.

One of the disadvantages of shifting joints of the sliding friction type is the wear which occurs both on the rounded or forward face which permits the bending and on the rearward or straight face which permits the shifting. In order to overcome this and minimize the wear, I employ a substantially half round shaped cross-section in the pintle part 3, instead of the usual round or nearly completely round pin. This half round shape gives a bearing face of the straight side about double that of former types, and on the rounded side permits about twice the radius of curvature of former types, while using a pintle pin of substantially the same longitudinal cross section. This also brings the center of articulation closer to the point of contact of the link on the driving sprocket. It will be noted that this half round shape has the center of articulation displaced from the center of the head of the link and is thus better adapted to fit into the configuration of the end of the link than a round or substantially round pintle, and gives a stronger joint without weakening the metal between the pintle hole and the outside faces of the link plates. The rounded side of the semi-circular pintle has about the same wearing surface as a round pintle of substantially twice the size, as the wear of a round pintle in practice is concentrated chiefly on a rather limited arc on the forward side; in other words, the half round pintle approximates the portion of a round pintle that in any case would take the brunt of the wear. The particular features mentioned just above form part of the subject matter of my copending application, Serial No. 258,377, filed March 1, 1928.

In the foregoing there has been described a joint characterized by a shifting pintle having a straight face tilted backward at the sliding contact when the chain is straight, and having a limited motion downward, and also having bearing surfaces of an increased radius of curvature, giving an increased capacity to resist wear, with the center of articulation displaced from the center of the head of the link.

In Figs. 4 and 5 a modification is shown in which the substantially straight or shifting side of the pintle part 3ª is on the left or forward side in the direction of motion, and the rounded or turning side of the pintle part 3ª is on the right or rearward side of the pintle. The straight side is initially tilted at an angle as before, but, since, in this case, it is in the free link, it does not turn or rotate during the process of engagement, and hence the tension forces tend to hold the pintle part 3ª in the same end of the pintle hole during the entire process of engagement, (in this case the lower end of the pintle hole). However, if external forces, such as the impact with the sprocket tooth, centrifugal force, vibratory forces, etc., happen to be present in sufficient amount, the end of the link seated on the sprocket tooth may shift upward relative to the free link of the chain, or, in other words, the free end of the chain may move downwardly relative to the sprocket. The joint, while not definitely shifted by rotation, is capable of shifting action under forces such as are often present in installations where smooth running is particularly desired. The operation will be evident from the foregoing—Fig. 4 showing the relative positions of the parts when the joint is straight and Fig. 5 when the joint is bent.

In Figs. 6 and 7 a modification is illustrated in which another element is introduced to still further increase the capacity to resist wear. In Figs. 1 to 5 inclusive, the pintle part 3 or 3ª was shown rubbing or wearing directly on the link plates 2, using the sides of the pintle holes in the link plates as bearing surfaces. Inasmuch as the link plates of adjacent links meeting at a joint are interspersed, the effective bearing surface on any one side of the joint can only be about half the width of the chain. In order to extend this bearing surface to the full width of the chain, a bushing pin 5 such as shown in Figs. 6 and 7 may be used, this bushing pin 5 being keyed or fixed in one set of links and extending across the full width of the chain through suitable clearance holes in the other links and providing a broad bearing surface for the pintle 3ᵇ. Fig. 6 and 7 also illustrate the use of a more rounded form of pintle hole which may, in some cases, have manufacturing advantages. The action of the joint, as will be evident from the drawings, is similar to that of Figs. 2 and 3, previously described.

Figure 9:
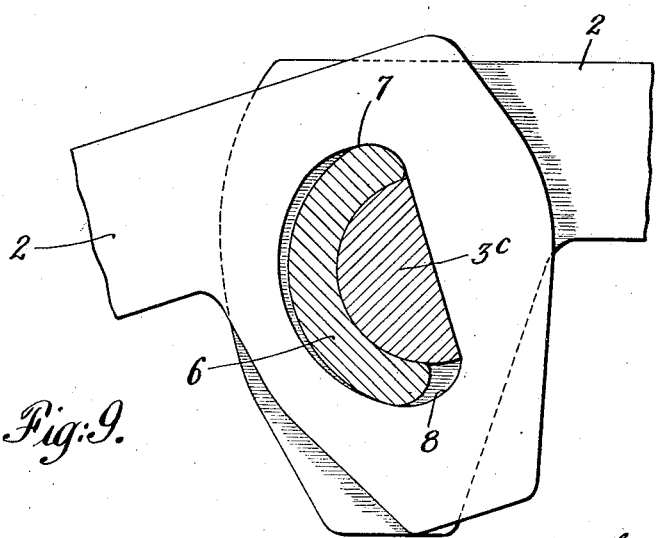

In Figs. 8 and 9 a wear resisting bushing 6 is applied to the rounded side of the pintle pin 3ᶜ, this bushing 6 being keyed or fixed in the forward end of each set of link plates, and extending across the width of the chain as did the bushing 5 previously described. A further modification illustrated in Figs. 8 and 9 is that the shifting action is not left entirely to friction and tension, but is positively produced by a camming action of the pintle holes, as will be described. Referring, first, to Fig. 8, which shows the joint in the straight position, it will be noted that the bushing 6 is in contact with the other link's pintle hole at the upper point 7 and the lower point 8, so that so long as the chain is straight, the bushing 6 and pintle part 3ᶜ cannot shift vertically relative to the link having the straight bearing face. When, however, the joint bends, as in going on a sprocket, the upper part of the hole at 7 will act as a cam and force the bushing 6 and pintle part 3ᶜ downward, while, at the same time, a sufficient clearance is swung into place at the lower end 8 to permit this. The pintle part 3ᶜ is thus shifted transversely to the line of pull by a positive camming action. When the joint straightens out again, as when leaving a sprocket, the reverse action takes place, the lower portion 8 of the pintle hole acting as the cam to force the bushing 6 upward.

In Figs. 10 and 11 a camming action is illustrated acting on the opposite bushing 5ª which is somewhat similar to the bushing 5 described in connection with Figs. 6 and 7, having the same type of broad bearing face for the straight sliding face of the pintle. The cam surfaces of the hole in the other link are, in this case, shown by the dotted line at 7ª and 8ª, and as the joint bends, the link having this hole is forced to ride up and down over the contacting edges of the bushing 5ª, thus shifting the joint vertically while the rotation or bending of the joint occurs on the rounded surface of the pintle part 3ᵈ.

In the foregoing I have described chain joints of the shifting type having bushings 5 on the shifting side of the pintle and also joints having bushings 6 on the rounded side of the pintle. Such bushings may also be placed on both sides of the pintle in shifting joints as shown, for example, in Figs. 12 and 13, and may be used either with or without the camming action.

While I have in the foregoing shown certain embodiments of the invention, it will be understood that these are merely for purposes of illustration, and that in view of the principles described, these joints may be made in various forms and contours, including the interchange of faces and parts, and the use of slightly curved surfaces where I have specified "straight." Various other modifications and adaptations will be apparent to those skilled in the art in various installations without departing from the scope of the invention, as particularly pointed out in the following claims.

I claim:—

1. In a power transmission chain, the combination of overlapping links, pintles connecting said links, the pintles having one face upon which the connected link may turn and another face upon which the adjacent connected link may shift transversely to the line of pull, said last mentioned face being substantially straight and tilted at an acute angle to a perpendicular to the line of pull when the chain is straight.

2. In a power transmission chain, the combination of overlapping links, pintles connecting the links, the pintles having one face upon which the connected link may turn and another bearing face upon which the adjacent connected link may shift transversely to the line of pull, the angle of bearing of said last mentioned bearing face being inclined to the line of pull so as to maintain a transverse component of the tension force on the pintle when the chain is straight and under tension.

3. In a power transmission chain, the combination of overlapping links, pintles connecting said links, the pintles having one face upon which the connected link may turn and another face upon which the adjacent connected link may shift transversely to the line of pull, said last mentioned face being tilted to the line of pull when the chain is straight.

4. In a power transmission chain, the combination of overlapping links having pintle holes, pintles in said holes and connecting the links, the pintles having one face upon which the connected link may turn and another face upon which the adjacent connected link may shift transversely to the line of pull, the pintle holes being formed to permit a limited transverse shift of the pintle but to stop said transverse shift before the full running bend of the chain is completed.

5. In a power transmission chain, the combination of overlapping links having pintle holes, pintles in said holes connecting the links, the pintles having one face upon which the connected link may turn and another face upon which the adjacent connected link may shift transversely to the line of pull, said pintle holes being formed with sufficient clearance to permit a transverse motion, said clearance being limited so as to leave no clearance in the direction of bending when the full running bend of the chain is completed.

6. In a power transmission chain, the combination of overlapping links having heads forming teeth, pintles extending through said heads and connecting said links, the pintles having one face upon which the connected links may turn and another face upon which the adjacent connected link may shift transversely to the line of pull, the center of articulation of the pintle being displaced to one side of the center of the head but arranged so the metal of the head is substantially equally distributed on both sides of it, whereby the effective bearing area of the pintle may be substantially increased without materially weakening the head.

7. In a power transmission chain, the combination of overlapping links, pintles connecting said links, the pintles having one face upon which the connected link may turn and another face upon which the adjacent link may shift transversely to the line of pull, and bushing means cooperating with said pintle and extending through the links for substantially the width of the chain.

8. In a power transmission chain, the combination of overlapping links, pintles connecting the links, the pintles having one face upon which the connected link may turn and another face upon which the adjacent connected link may shift transversely to the line of pull, and cam means operated by the bending of the chain for moving the pintle on its shifting face.

9. In a power transmission chain, the combination of overlapping links having pintle holes, pintles in said holes and connecting the links, the pintles having one face upon which the connected link may turn and another face upon which the adjacent connected link may shift transversely to the line of pull, the pintle holes being formed with cams adapted to shift the pintle transversely.

10. In a power transmission chain, the combination of overlapping links having pintle holes, pintles in said holes and connecting the links, the pintles having a substantially semi-circular face and a substantially straight face, a bushing means cooperating with the pintles and extending through the links substantially the width of the chain, said pintle holes having cam faces adapted to cooperate with the bushing means so as to shift one set of links relative to its adjacent set of links when the chain is bent.

In testimony whereof I have hereunto signed my name.

FRANK L. MORSE.